Dec. 10, 1968 P. A. BLACKBURN ET AL 3,415,952

AUTOMATIC POWER LEVEL CONTROL FOR RADIOTELEPHONY COMMUNICATION SYSTEMS INCLUDING A REPEATER STATION

Filed Dec. 4, 1964 6 Sheets-Sheet 1

Dec. 10, 1968 P. A. BLACKBURN ET AL 3,415,952

AUTOMATIC POWER LEVEL CONTROL FOR RADIOTELEPHONY COMMUNICATION SYSTEMS INCLUDING A REPEATER STATION

Filed Dec. 4, 1964 6 Sheets-Sheet 2

United States Patent Office 3,415,952

Patented Dec. 10, 1968

3,415,952

AUTOMATIC POWER LEVEL CONTROL FOR RADIOTELEPHONY COMMUNICATION SYSTEMS INCLUDING A REPEATER STATION

Peter Alan Blackburn, Fareham, Henry Robert Chesters, Emsworth, and Eric Charles Seeley, Rowlands Castle, England, assignors to Plessey-UK Limited, Essex, England, a British company Filed Dec. 4, 1964, Ser. No. 416,686
12 Claims. (Cl. 179—15)

ABSTRACT OF THE DISCLOSURE

In order to enable a number of subscriber transmitters operating on one common carrier to be received by and relayed on a different common carrier from a relay station, the subscriber transmitters are automatically attenuation-controlled from the relay station to equalise their reception levels at the relay and thus minimise cross-talk in plural-channel transmission. Each communication channel from the relay to a subscriber has a control channel allocated to it in one of the channel separation gaps of its carrier while each subscriber transmitter sends on its carrier a pilot tone, which is of predetermined volume subject to the action of the transmitter attenuator, in a pilot-tone channel whose relation to the communication channel of the subscriber transmitter is similar to that of the control-tone channel to the associated communication channel from the relay to the subscriber.

This invention relates to radiotelephony communication systems and has for an object to provide an improved communication system which makes it possible for a plurality of receivers, all operating on the same carrier wavelength and capable of operating simultaneously but each using a separate modulation channel, to be accommodated in close spatial adjacency to each other in a relay station re-transmitting them on a different carrier wavelength with a minimum of mutual interference when the receiver for each channel co-operates with a transmitter of a different station, hereinafter called subscriber, the stations being movable independently of each other or otherwise subject to individually varying attenuation of their transmitters.

According to a broad aspect of the invention each of the subscribers is equipped with an adjustable attenuating device for its transmitter, said device being controlled, in accordance with the level at which a pilot tone emitted, at a predetermined level subject to the same attenuation, by the transmitter of the subscriber in a narrow channel separated in modulation frequency from the telephony channel of the subscriber, is received by the relay station. Control signals, determined by the received level of the pilot-tone from the subscriber, are transmitted by the relay station in a modulation channel similarly related to the telephony channel in which the relay station re-transmits the telephony signals received from the subscriber in question, and when detected at the subscriber's receiver these control signals control the signal level from the subscriber's transmitter by effecting adjustments to the subscriber's attenuating device. The term "telephony" when used in this specification indicates any form of signals which is not constituted by pulses and which is therefore of irregularly variable amplitude. It thus may include, for example, video signals of a television transmission.

The bandwidth available for the channels containing the pilot tone and the signals hereinafter jointly called the control channels, need only be a small fraction of the bandwidth of the communication channel, from which each control channel is spaced by suitable filter arrangements to ensure separation. If only one channel in each transmitted sideband is employed for communication, the control channels are conveniently arranged, one at each side of the carrier, in the gap between the carrier frequency and the lowest modulation frequency required for the communication channel; in the case of multi-channel communication further control channels are conveniently placed in the gaps between adjacent communication channels of each sideband.

Preferably the transmitter of each subscriber is equipped with a stepped attenuator adjustable in equal-ratio steps of two alternatively available decibel sizes, for example three and nine decibels respectively, each attenuator being arranged to be set, at the beginning of each transmission, for maximum attenuation, and to decrease the attenuation at regular time intervals by the larger of the two sizes of step available until the pilot tone received by the receiver of the relay station reaches a predetermined level, hereinafter referred-to as recognition level, whereupon the relay sends a control signal which is arranged to change the steps from the larger to the smaller size. These smaller steps then follow at the same time sequence until, when the desired operating level is reached within, say, half the ratio of one of the smaller steps, the relay is arranged to send out a further control signal which is arranged to stop the attenuator stepping sequence. Two discrete control signals are thereafter available for transmission by the relay, one being an "increase" signal, which is emitted to increase the signal level when the signal level at the receiver falls to more than half a step below the desired level and operative to re-start the original attenuation-decreasing stepping sequence employing the smaller size of steps, and the other conversely being a "decrease" signal which is emitted when the signal level at the receiver rises by more than half a step above the desired level and operative to initiate a reverse stepping sequence in the transmitter of the subscriber, also utilising the smaller size of steps, in order to increase the attenuation of the transmitter thereof.

To minimise the number of different signals needed, it is proposed to use the same control signal for "change" and "increase." Similarly the "stop" signal will also be used as the "decrease" signal. This combining of signal meanings is made possible by their use at known different times in the sequences of events. Since, in view of the nature of telephone communication, the amplitude of the signal waveform will vary rapidly irrespective of the attenuation between transmitter and receiver, the transmitter of each subscriber is, as already mentioned, arranged to emit, in addition to the communication signal, a control tone of constant amplitude, arranged in the appropriate sideband at the place corresponding to the control channel of the relay transmission, and it is the intensity of the control tone received which is utilised for determining the kind of control signal to be emitted from the relay station and its time of emission. In practice the sidebands used for telephony transmission may extend nominally from 300 cycles per second to 3 kilocycles per second, in which case a band of a width of 50 cycles per second, centred at 100 cycles per second, may be used for the pilot or control channel in each transmitter. In a multi-channel system using, if desired, compressed speech, additional control channels or pilot-tone channels are inserted in the guard bands between adjacent channels. Preferably the control signal comprises two succesive pulses the first of which serves as a reference while the second is employed to constitute one or the other of three alternative signals according to whether the demodulated control tone of the second pulse is in phase or in antiphase with the reference pulse or is omitted altogether. In this manner the control is comparatively safe from spurious effects. Conveniently each station is so constructed that it can be used alternatively as a subscriber station or release relay station. Since this only requires comparatively few additions to the apparatus required.

In order that the invention may be readily understood, some important features of a practical embodiment of the invention will now be described in more detail with reference to the accompanying drawings, in which:

FIGURE 1 shows for independent sideband telephony according to the invention the two communication channels and the two pilot-tone or control-signal channels and their attenuation in the regions of mutual inter-penetration.

FIGURE 2 similarly illustrates the channel distribution for multi-channel telephony, in which more than one communication channel is provided in each sideband of the carrier. The figures are applicable both to the subscriber and relay stations since, although the transmissions from the two have different carrier frequencies, the distributions of the telephony and control (or pilot-tone) channels in the sidebands is the same in both cases.

The control is effected on the basis of fixed sampling cycles.

Figure 1:
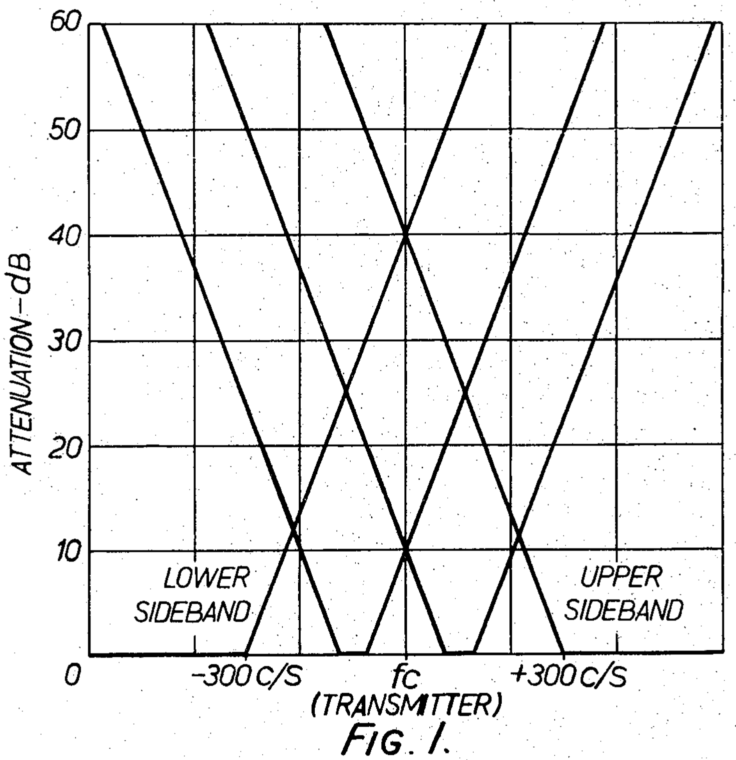
Figure 2:
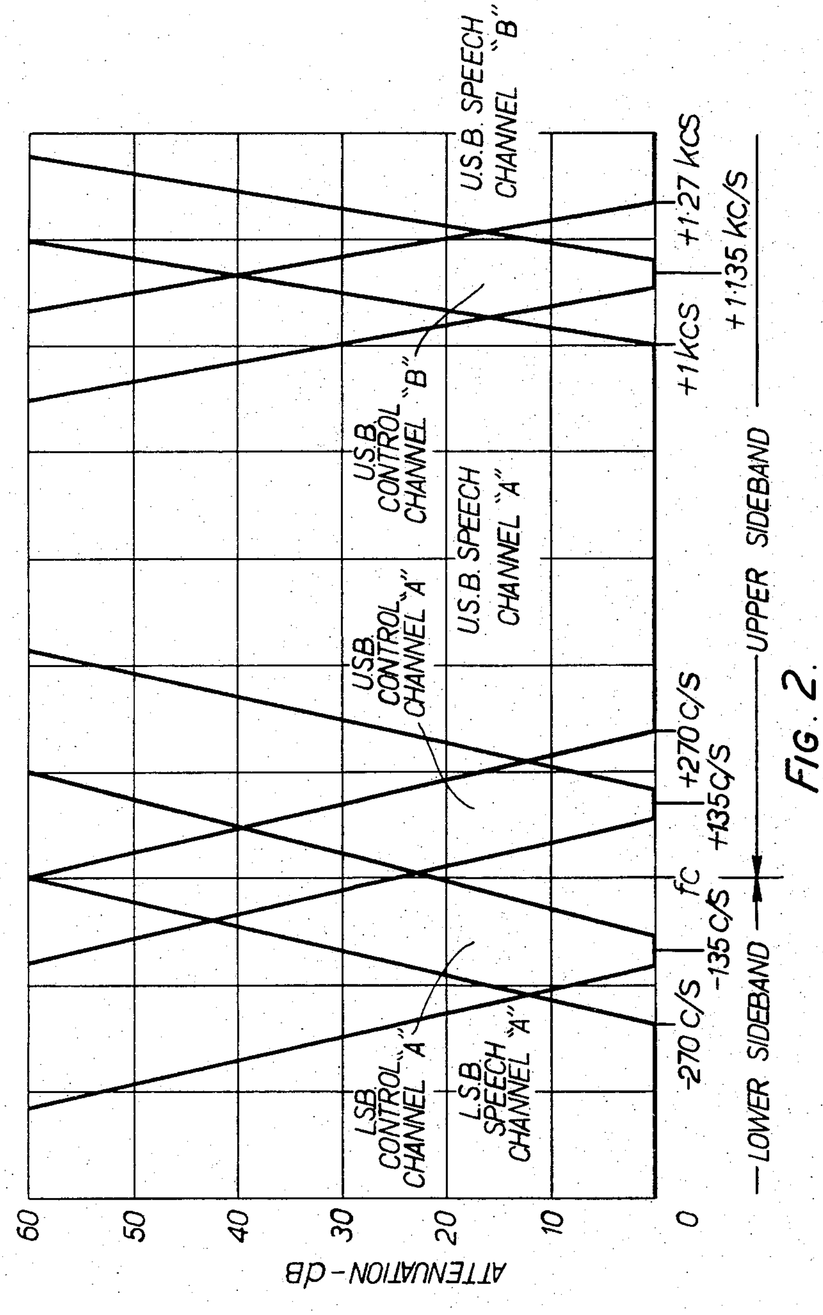
Figure 3:
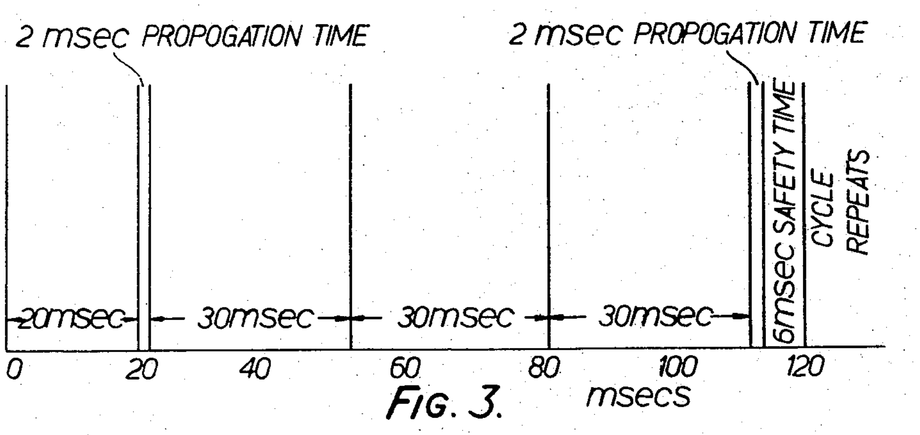
FIGURE 3 illustrates the sequence in which in each cycle, pilot-tone signals are sent from the subscriber and control signals from the relay.

In the example of FIGURE 3 it has been assumed that the equipment of the subscriber has just passed a signal to its transmitter attenuator to cause a change. Let this be the time zero. After a maximum of 20 msec., the attenuator will have operated, and therefore the power level radiated will have changed. At +20 msec. a 30 msec. pulse of pilot tone is initiated at the subscriber, followed by a further 30 msec. pulse at the same frequency but in opposite phase. A maximum of 2 msec. has been allowed for the transit time of these signals between the subscriber and relay stations.

When the first pulse is received at the relay, its phase is measured and stored (for example by phase-locking an oscillator). Starting at the end of this pulse a similar 30 msec. pulse is broadcast by the transmitter of the relay to be received by the subscriber concerned.

During the reception of the second pulse from the subscriber, the relay equipment uses the stored phase information to obtain the pulse amplitude via a phase-sensitive detector. The amplitude information thus obtained is then compared with a reference level. A single 30 msec. pulse from the relay transmitter is then used to transmit the result of this comparison to the subscriber in the form of an attenuator command. Allowing for a further 2 msec. transit time back to the subscriber, a total sequence time of 120 msec. gives a processing and safety time of 6 msec.

The 120 msec. sequence time is generated at the subscriber and is continuous during the whole of a transmission period, including the run-up phase of the sequence hereinafter described with reference to FIGURE 4.

Figure 4:
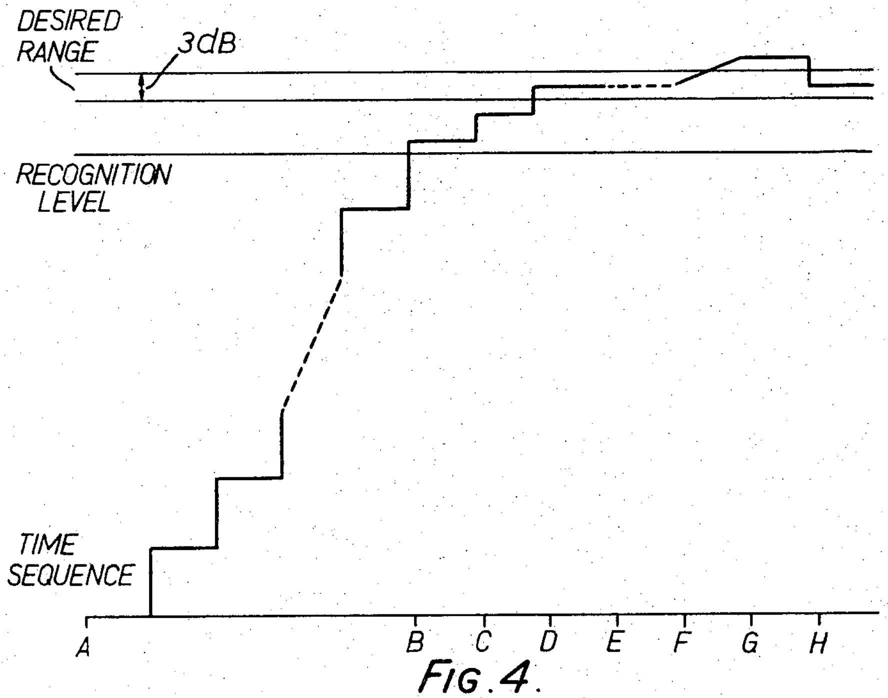
FIGURE 4 illustrates the successive adjustment steps of the attenuator of a subscriber from the moment the transmitter is switched on to the moment at which he transmitter reaches, as a result of the progressively decreased attenuation, the power required to reach the desired level of reception at the relay station.
Figure 5:
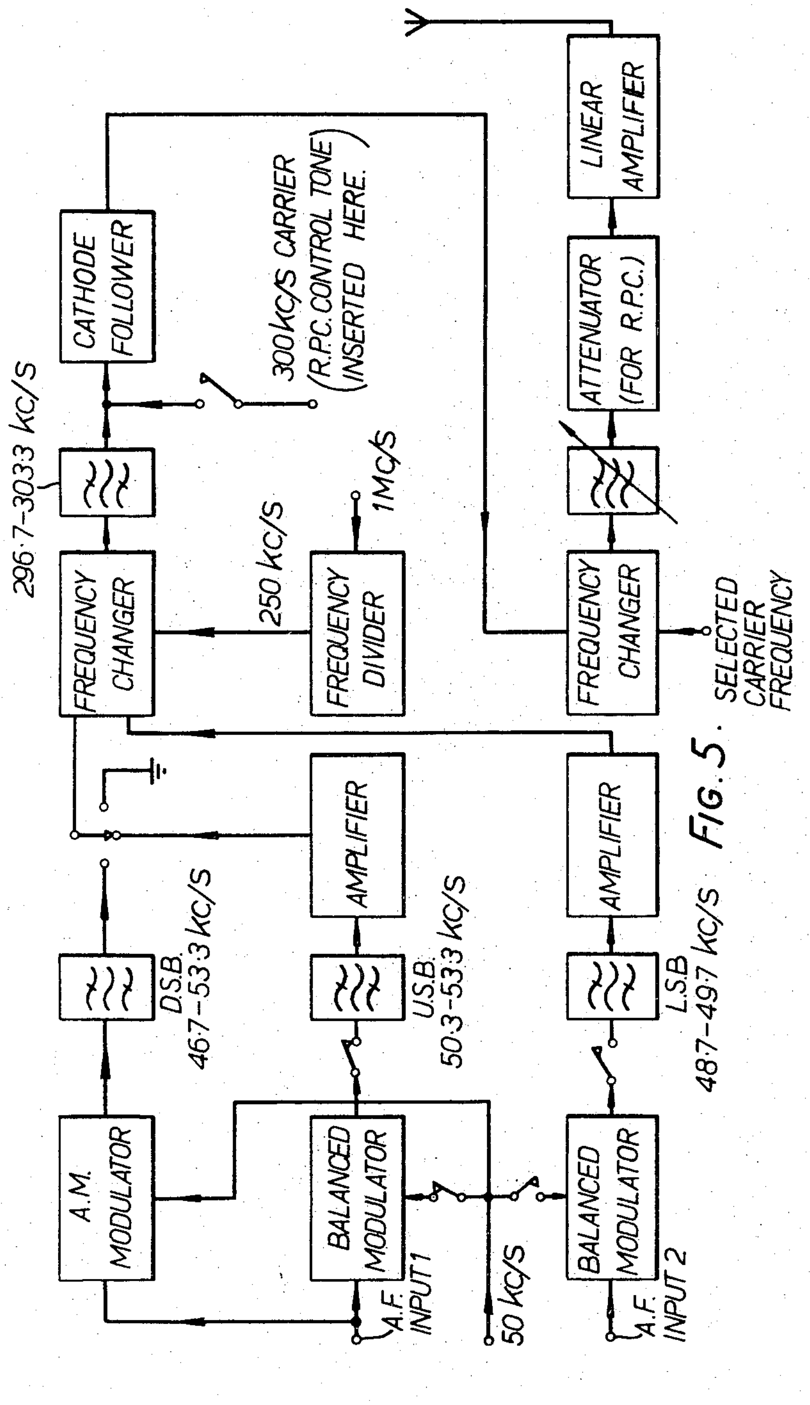
FIGURE 5 shows one simplified form of transmitter which can be used for the purposes of the invention.
Figure 6:
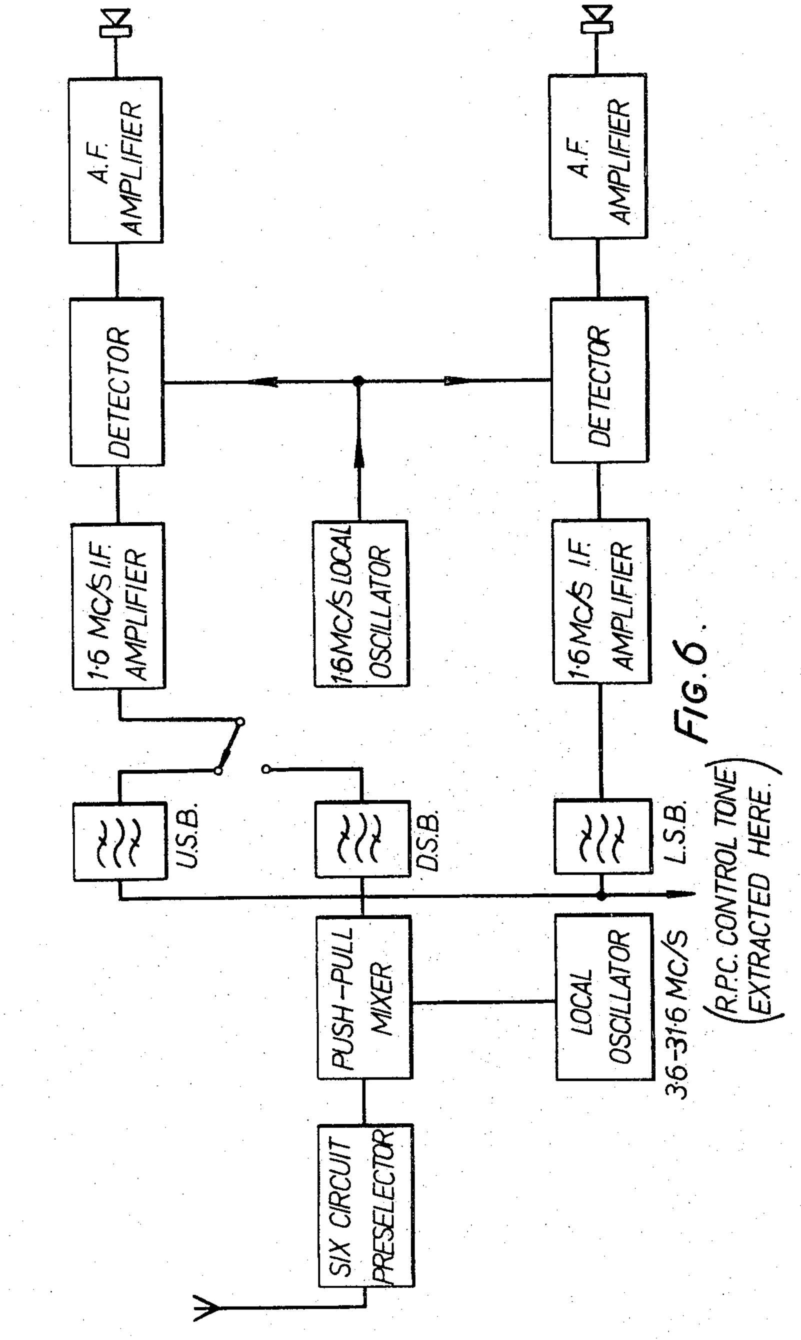
FIGURE 6 is a block diagram of a suitable receiver.

Referring now to FIGURE 4 and assuming that a subscriber wishes to speak and has pressesd his own switch, and further assuming that the two step sizes available are nine decibel and three decibel respectively, this causes the subscriber's transmitter attenuator to start stepping to reduce attenuation in 9 db steps at 120 msec. intervals whilst sending the pilot tone appropriate to the channel. At some stage the level of reception of the pilot tone will be recognised by the relay equipment as being a preset ratio of the desired final level. The value of this ratio will depend on the final desired signal-to-noise ratio but could be for example −10 db. A recognition signal is then sent by the relay and is used by the subscriber equipment to change from 9 db steps to 3 db steps. After a further three steps the signal level will be correct at the relay within a ½ step. A further control signal is then sent to the subscriber. This signal is used to stop the attenuator and to signal, for example by lighting a lamp, that the channel is available.

During the ensuing period of use corrections to the subscriber power level are liable to be needed. The subscriber equipment should therefore continue to transmit its sequence of pilot-tone signals every 120 msec. When the level of reception at the relay varies by more than ±1.5 db from the desired level, a correction signal is sent. Two distinct correction signals are needed; one being an "increase power" or "up 3 db" command and the other being a "decrease power" or "down 3 db" command to the attenuator.

In order to overcome difficulties associated with long-range operation in the presence of deep fading, it is preferable that on the one hand the "change" and "up 3 db" signals and on the other hand the "stop" and "down 3 db" signals should be identical.

Two distinct control signal are thus required, and these are available in the pulse sequence described, by transmitting from the relay two pulses similar to those from the subscriber, the second pulse being either in phase or 180 degrees out of phase with the first pulse, which acts as the reference, as in the pilot tone pulses from the subscriber. This first or reference pulse is sent by the relay during reception of the second pilot tone pulse from the subscriber to save cycle time. Using this coding and cycle time and assuming a maximum attenuation of 90 db, the maximum time lag between demanding and receiving a channel is 1.44 sec. (9 steps of 9 db and 3 of 3 db). This maximum will occur at extreme range and under unfavourable combinations of range and polar-diagram conditions. The maximum rate of change of signal level achievable during the operating period, i.e. after the change-over to 3 db steps, is 30 db in 1.2 sec.

Further economy in frequencies or channels can be achieved by sharing a channel between a number of subscribers, instructing such subscriber not to use a channel unless his receiver shows that the channel is not in use by another subscriber.

In order to enable this priority to be over-ridden in order to pass an emergency signal, each subscriber may be provided with a separate and distinct emergency switch, operation of which causes the attenuator of the subscriber to be brought immediately to the minimum-attenuation position and to be set to 9 db steps "downwards" (as regards power output).

If this happens when the channel is not in use by any other subscriber, the relay station will first send the "change" or "up" signals, since the reception level will exceed the recognition level. This signal will be recognised but is arranged to be ignored. The next control signal will then be "down" or "stop." This will be interpreted as "down" and therefore likewise have no effect. The following signals will be "down" and thus would allow the run down to continue until the standard level is reached. The next signal will then be "up" and is used to change to 3 db downward steps. The first of these will cause a temporary drop below the standard level, and the resultant "up" signal will be interpreted as "stop," whereafter the normal control procedure is in operation.

If the channel required is already in use by another subscriber, the action in response to an emergency call is similar except that the relay station will not emit a "change" signal. In this case the resulting "down" signals cause the suppression of the second subscriber's signals, thus clearing the way of the transmitter requiring the emergency facilities. Preferably the actuation of the emergency switch is also arranged to cause a warning tone to be transmitted in the required telephony-signal channel to warn other subscribers who may wish to use that channel.

On completion of the two parts of the above emergency sequence a lamp is preferably arranged to light to indicate that the channel is cleared for the emergency use. Interference with other channels by cross-coupling during this process would be limited to a maximum of about 1 second duration and would be of diminishing severity during this period. The cross-coupled signal would be the emergency warning tone.

Figure 7:
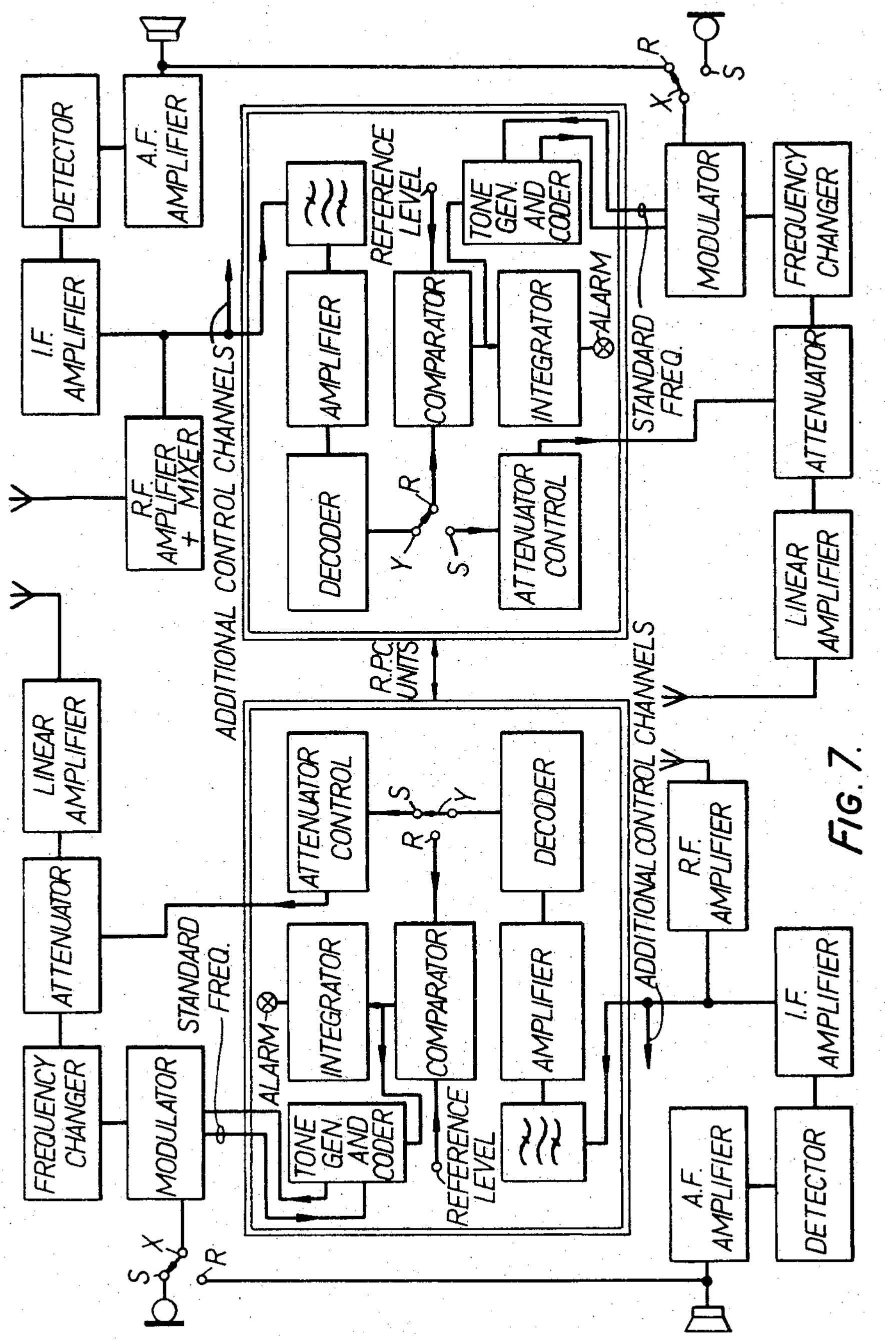
FIGURE 7 is a schematic block diagram of the complete system, only one subscriber being however shown in this diagram.

Referring now to FIGURE 7, the equipment provided in subscriber and relay stations in this diagram is identical. Two switches X and Y are provided, which each, when placed in position B, establish the circuit required for a subscriber and in position R establish the circuit required for the relay station. Assuming now that the subscriber station shown at the left of the diagram wants to begin transmission, a channel demand is applied to the attenuator-control unit of the subscriber to start a sequence of 9 decibel steps decreasing the attenuation. The signal transmitted from the subscriber will contain, in the associated control channel, a pilot tone of predetermined amplitude at the modulator, and this tone will be subject to the momentarily operative attenuation by the attenuator and will thus give at the receiver end an indication of the reception level of the required channel. At the relay receiver, a sample of the intermediate frequency is fed through control-channel filters to separate the frequency of the pilot-tone signals associated with the desired communication channel. The separated frequency is then fed to its amplifier and signal decoder, and the output of the decoder is fed to a comparator for comparison with a reference voltage. The "recognition level" can be established either by using a second reference voltage or by means of additional amplification of the pilot tone prior to comparison. The result of the comparison is then coded and transmitted from the relay station. At the subscriber station the reception, filtering, and decoding functions are similar to those at the relay station, but the decoder output is fed to the attenuator control unit of the subscriber.

In the illustrated embodiment the output of the comparator at the relay station is also taken to an integrator controlling an alarm. When the channel is in use, the integrator output will be zero as long as the loop is functioning correctly, so that any large deviation over a long period (several seconds) will indicate a malfunction of the loop. In this case the alarm will give an indication of the failure.

We do not claim the general idea of the remote control of the power of a transmitter nor the general idea of using one modulation waveband of a carrier for the transmission of speech or other information and another for the transmission of control commands for the attenuation of the transmitter, nor the use of a stepped attenuator or the provision of alternative step sizes for the latter, but subject to this disclaimer what we claim is:

1. A plural-channel radiotelephony system for communication, via a relay station, between a number of subscriber stations each having a transmitter and a receiver, the transmitters of a number of individual subscriber stations being adapted to operate simultaneously, each on a different information modulation channel of a common first carrier wavelength, and the respective receivers of each of said individual subscriber stations being adapted to operate at the same time, each on a different information modulation channel of a common second carrier wavelength, the relay station being equipped with receiver means having output circuits for respective operation on each of said different information modulation channels of said first carrier wavelength and with transmitter means adapted for mutually independent and simultaneous transmission on each of said different information modulation channels of said second carrier wavelength to respectively retransmit the information received by the individual receiver output circuits of the relay station, wherein each subscriber-station transmitter has an additional circuit for transmitting a pilot tone on a pilot-tone channel individually allocated to the information channel used by said transmitter, this pilot-tone channel being a further modulation channel of said first carrier wavelength and being separate from all information channels of said first carrier wavelength and from the pilot-tone channels respectively allocated to all other information channels of said first carrier wavelength, the pilot tone having a basic volume common to all subscriber stations, wherein furthermore the relay-station receiver means have individual output circuits for each pilot-tone channel and the relay-station transmitter means are further adapted to effect, in addition to their transmission on such information channels of said second carrier wavelength, the simultaneous transmission of control signals on a number of control channels respectively allocated to such information channels, each control channel being a further modulation channel of said second carrier wavelength and being separate from all information channels of said second carrier wavelength and from all other control channels of said second carrier wavelength, means being provided in the relay station which automatically vary the character of the control signal transmitted on each control channel in accordance with the strength of reception of the pilot tone in the associated pilot-tone channel, and wherein each subscriber-station receiver has an individual output circuit for the control channel associated with the information channel used by said receiver, and each subscriber station is equipped with an attenuator equally effecting the transmission of the subscriber station transmitter on the pilot-tone channel and on the information channel of said transmitter, and with an automatic adjusting device for said attenuator, selectively so responsive to the control signals received by the subscriber-station receiver on said control channel as to cause the strength of reception of the pilot tone at the relay station to approach a predetermined value.

2. A system as claimed in claim 1, wherein the pilot-tone channel for each subscriber is related to the first carrier wavelength in the same manner in which the associated control channel of the relay station is related to the second carrier wavelength.

3. A system as claimed in claim 1, wherein the attenuation device includes a stepped attenuator arranged to normally assume the maximum-attenuation position, characterised in that the relay transmitter is arranged to transmit in each control channel a control pulse of one kind when in the associated channel a pilot tone is received of an amplitude above a predetermined recognition level but below a predetermined operating standard, and a control pulse of another kind when the received amplitude of said pilot tone is above the said operating standard and that the stepped attenuator is arranged, when the transmitter of the subscriber is put into operation, to decrease the attenuation by uniformly spaced steps, upon receipt of a control pulse of said other kind, to increase attenuation by similar steps, and upon receipt of a control pulse of the first kind, to recommence stepping operation to decrease attenuation.

4. A system as claimed in claim 3, wherein the attenuator is arranged for alternative operation at two different step sizes, characterised in that the stepped attenuator is arranged upon commencement of the transmitter operation to advance by steps of the larger step size and upon receipt of the first control signal to change over to advancing by steps of the smaller size.

5. A system as claimed in claim 4, characterised in that the same form of control signal is employed both for the decrease in step size and for the recommencement of the stepping operation to decrease attenuation.

6. A system as claimed in claim 3, characterised in that the relay station is additionally arranged to emit a control pulse of a predetermined kind when the amplitude at which the pilot tone is received is, within a predetermined accuracy, equal to the said standard, and that the stepped attenuator is arranged to stop operation upon receipt of such stop control pulse.

7. A system as claimed in claim 6, characterised in that the stop control pulse is identified to the pulse initiating reverse operation of the stepping device.

8. An independent side-band system as claimed in claim 1, characterised in that two pilot-tone channels are provided, one at each side of the carrier, in the space between the carrier frequency and the minimum frequency of the sideband employed for the transmission of information.

9. A multi-channel transmission system as claimed in claim 1, characterised in that a pilot tone channel is provided in each guard band between adjacent communication channels.

10. A system as claimed in claim 7, characterised in that each substation is equipped with an emergency switch arranged to cause the subscriber's variable-attenuation device to be moved at once to the minimum-attenuation position.

11. A system as claimed in claim 3, characterised in that each substation is equipped with an emergency switch arranged to cause the subscriber's variable-attenuation device to be moved at once to the minimum-attenuation position, and the stepped attenuator to operate thereupon in such a direction as to increase attenuation.

12. A system as claimed in claim 4, characterised in that each subscriber station is equipped with an emergency switch arranged to cause the subscriber's variable-attenuation device to be moved at once to the minimum-attenuation position, and the stepped attenuator to operate thereupon to increase attenuation in the larger of the step sizes available, this being arranged to be changed to the smaller step size upon the receipt of a signal indicating the reading of the standard level of reception.

References Cited

UNITED STATES PATENTS

| | | | |
|---|---|---|---|
| 2,678,998 | 5/1954 | Young | 325—51 X |
| 3,120,642 | 2/1964 | Kahn | 325—330 |
| 3,151,295 | 9/1964 | Haviland | 325—3 |
| 3,315,164 | 4/1967 | Ferguson et al. | 325—62 X |

ROBERT L. GRIFFIN, *Primary Examiner.*

BENEDICT V. SAFOUREK, *Assistant Examiner.*

U.S. Cl. X.R.

325—3, 50, 51, 62; 343—177